United States Patent
Torelli

[15] 3,689,011
[45] Sept. 5, 1972

[54] AIRCRAFT

[72] Inventor: Dorant Torelli, 28 Park Place, Branford, Conn. 06405

[22] Filed: July 11, 1969

[21] Appl. No.: 840,959

[52] U.S. Cl. .................................................. 244/12 C
[51] Int. Cl. .................................................. B64c 29/00
[58] Field of Search ................................. 244/12, 23

[56] References Cited

UNITED STATES PATENTS

| | | | |
|---|---|---|---|
| 3,002,709 | 10/1961 | Cochran | 244/12 C |
| 3,129,905 | 4/1964 | Taylor | 244/12 C |
| 2,322,715 | 6/1943 | Kloeren | 244/7.1 |
| 2,801,058 | 7/1957 | Lent | 244/12 |
| 2,843,339 | 7/1958 | Streib | 244/12 |
| 2,876,964 | 3/1959 | Streib | 244/12 |
| 3,184,183 | 5/1965 | Piasecki | 244/23 |
| 3,207,246 | 9/1965 | Weiland | 244/23 |
| 3,465,989 | 9/1969 | Bowshier | 244/23 |

*Primary Examiner*—Milton Buchler
*Assistant Examiner*—S. G. Kunin
*Attorney*—Roy L. Parsell

[57] ABSTRACT

A heavier than air aircraft having an elongated oval shaped single wing of a substantial thickness at its center to enclose a hub portion concentric with the vertical axis of the aircraft, the wing tapering toward its periphery from the thickness at the hub.

The aircraft has a power driven rotor having driving blades to propel the aircraft in a vertical direction and jet engines mounted in the wing for propelling the aircraft along its horizontal course.

The surfaces of the wing are so contoured as to assist the aerodynamic forces in stabilizing and guiding the aircraft while under power or in a gliding state.

1 Claim, 8 Drawing Figures

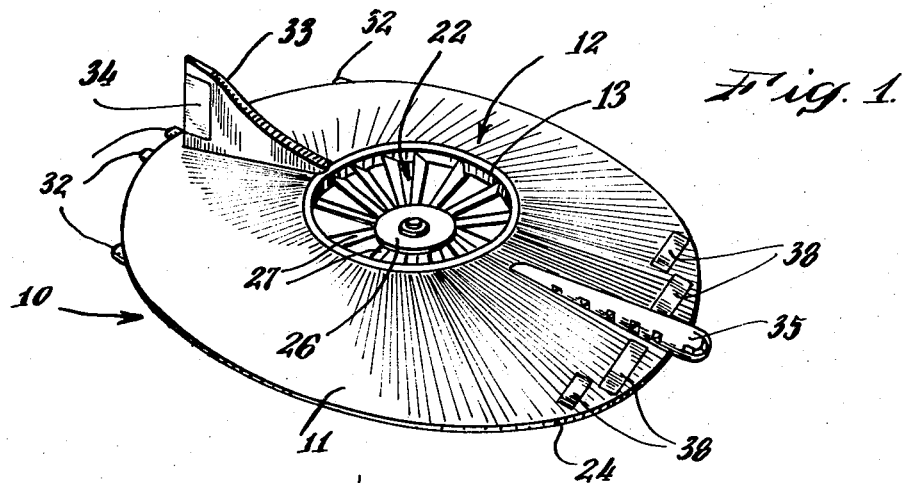
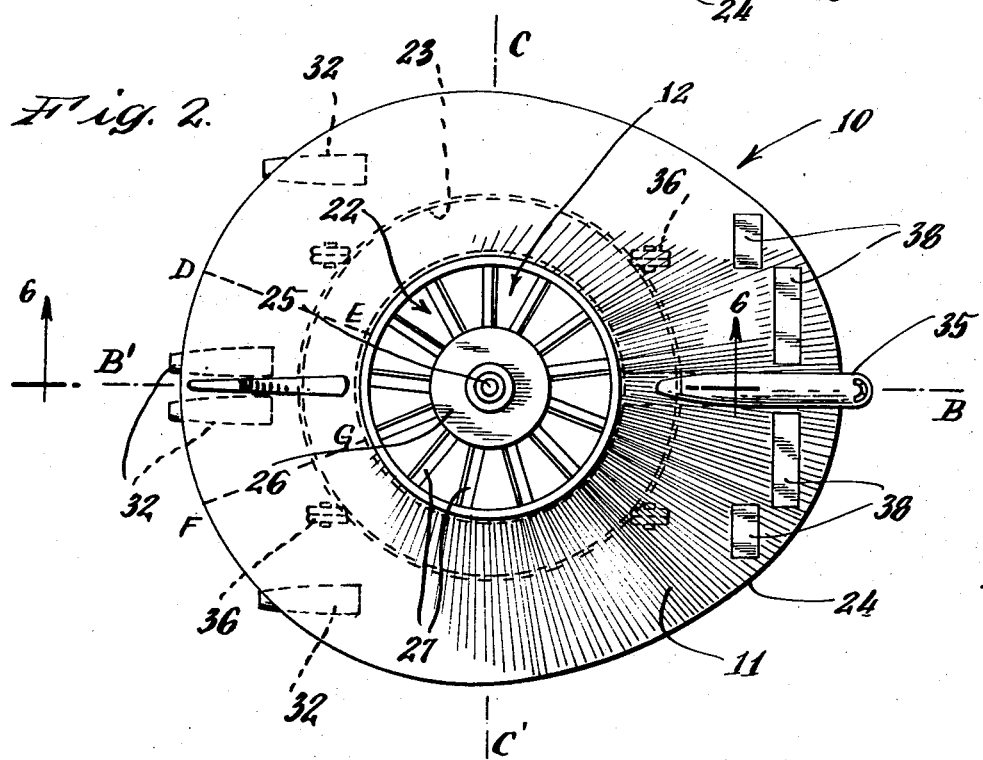
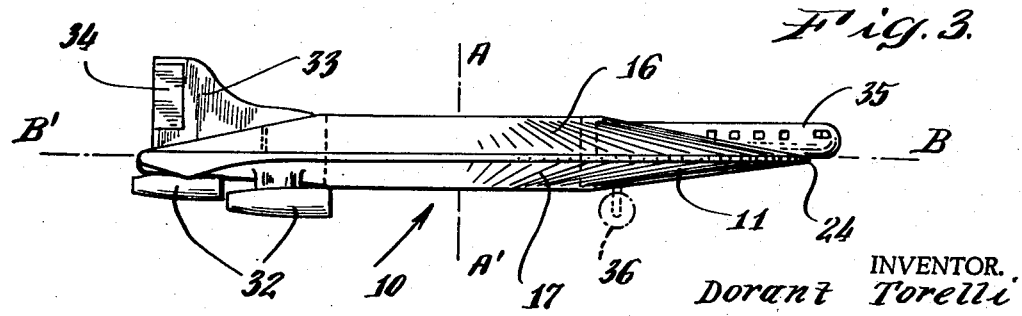

INVENTOR.
Dorant Torelli
BY
Roy L. Parsell
ATTORNEY.

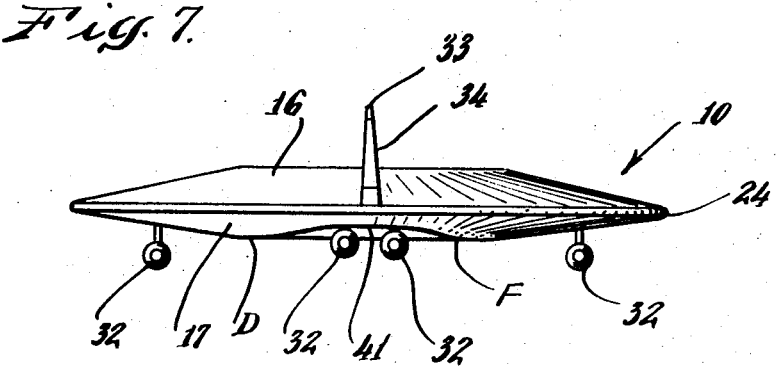
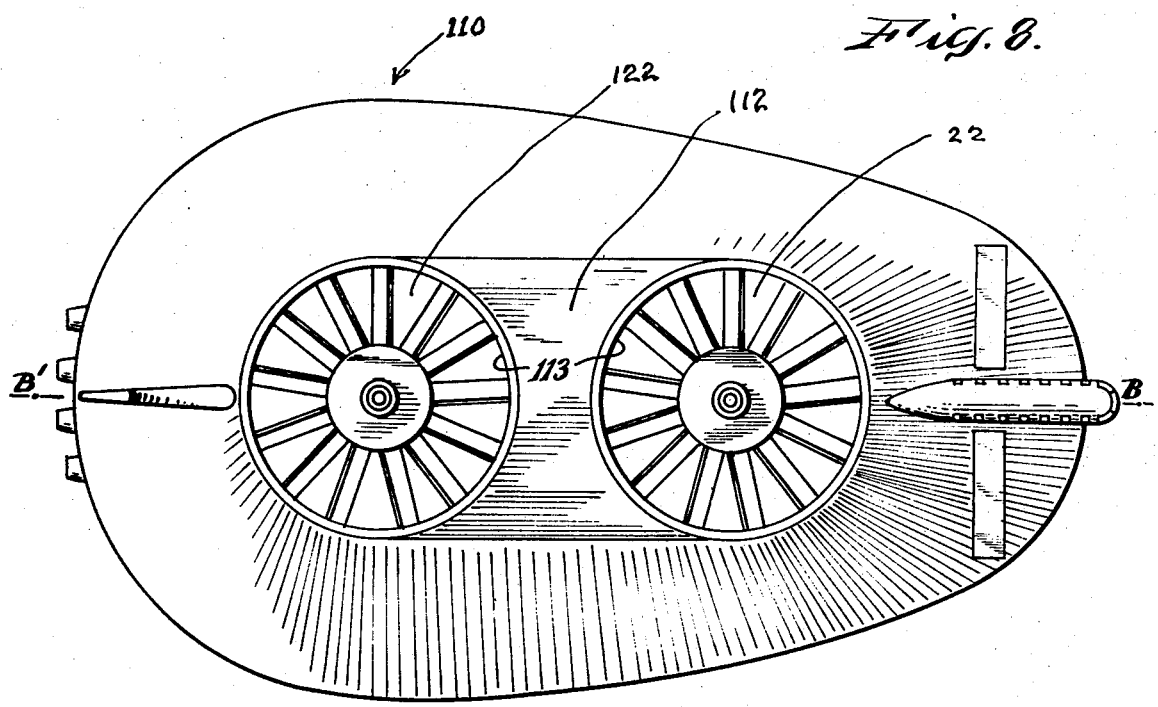
INVENTOR.
Dorant Torelli
BY
Roy L. Parsell
ATTORNEY.

AIRCRAFT

Heavier than air aircraft generally comprise three classes, viz (1) airplanes driven by a blade propeller or jet whose forces act in a general direction to push or pull the craft on a desired course and whose departure from the surface of the earth is essentially sloping; (2) aircraft of the helicopter type in which a bladed propeller lifts the aircraft vertically and after attaining a desired altitude by means of a slight tilting of the propeller blades enables the craft to effect translation relative to the earth which is at a much slower rate than the airplane of the first class just mentioned. However, altitude is obtained in aircraft of the second class in a much shorter time. And (3) gliders which have no source of power aboard and are towed to a desired height and turned loose to glide to their desired destination.

It is one of the objects of my invention to provide an aircraft which will have the combined advantages of all three classes, i.e. the ability to rise vertically of class 1 and to have the gliding fast translation of the first and second classes.

Obviously the ability to take off and land vertically eliminates the need of long runways especially those runways required solely by jets, and also in emergency cases where runways are not available a landing may be effected in such as an open field or flat roof top while not sacrificing the ability for rapid translation relative to the earth's surface.

Other objects and a fuller understanding of the invention may be had by referring to the following description and claims, taken in conjunction with the accompanying drawings in which:

FIG. 1 is a perspective view of my aircraft showing the top right side and forward end;

FIG. 2 is a plan view of the top of the aircraft;

FIG. 3 is a right side elevation;

FIG. 7 shows a rear elevation; and

FIG. 8 is a plan view of another embodiment of my invention.

Figure 4:
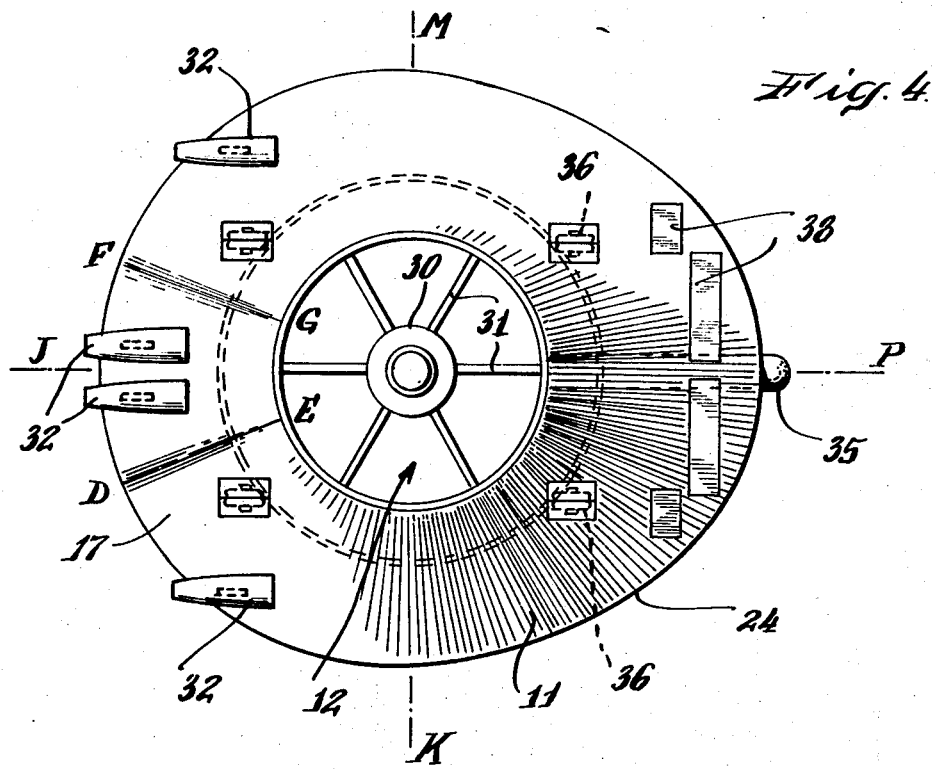
FIG. 4 is a view of the bottom of the aircraft as viewed from a point directly below.

Referring now to the drawings, the aircraft 10 is constructed about a vertical axis $AA^1$, a longitudinal axis $BB^1$, and a lateral axis $CC^1$, each axis being at 90° to the other respectively.

In the preferred form of my aircraft the wing 11 is continuous and surrounds the hub 12 forming overall an elongated oval figure somewhat narrower along the leading edge so that the oval could be included in a sort of triangle with the apex pointed forwardly in the direction of flight.

Figure 6:
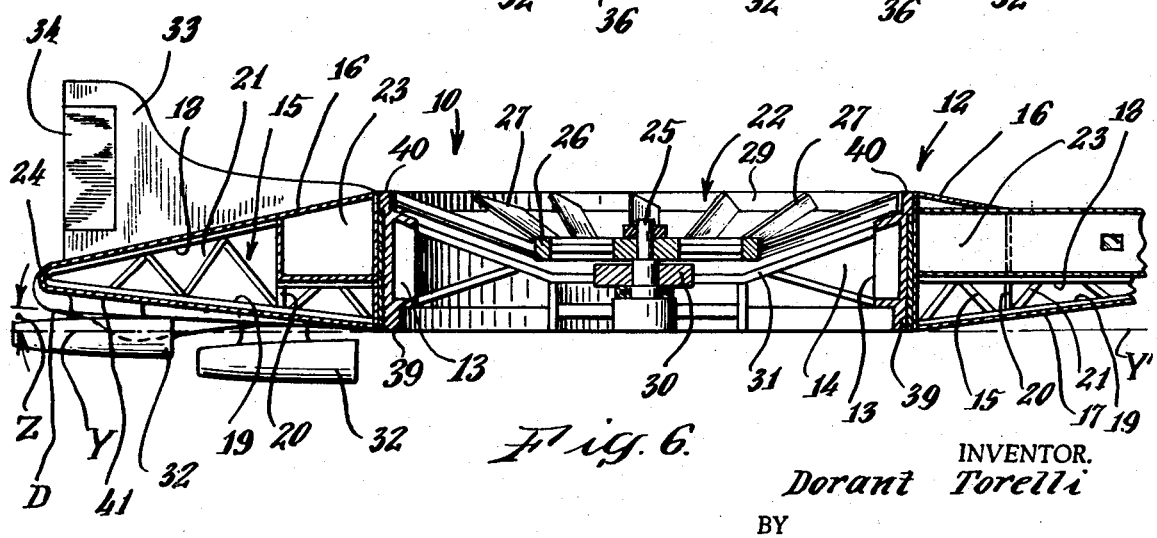
FIG. 6 is a sectional elevation in part taken along line 6—6 of FIG. 2.

A centrally disposed structural hub portion 12 is provided with a strong rigid cylindrical wall 13 forming a hollow central chamber or conduit 14. Within this chamber 14 is mounted a rotor 22 and power source for propelling the aircraft vertically which will be described in detail subsequently. Securely mounted on the outside of the wall 13 (see FIG. 6) are cantilever trusses 15 for supporting the continuous wing 11, the structure of which will also be subsequently described in detail.

The cantilever trusses 15 are circumferentially spaced around the wall 13 so as to provide spaces for cabin compartments 23 for passengers, storage compartments for cargo and fuel and other supplies.

The cantilever trusses 15 may be constructed in any suitable manner which will provide the necessary strength and be of light weight.

Referring again to FIG. 6 it will be noted that wall 13 is shown cross hatched for clarity which might indicate a solid type of wall. However, in the preferred embodiment a truss structure similar in construction to the cantilever trusses 15 is used.

The preferred structure of the trusses comprises essentially top 18 and bottom 19 rails supported by studs 20 and with diagonal bracing 21. Intermediate trusses (not shown) may circumferentially connect the respective adjacent cantilever trusses 15 if desired.

Figure 5:
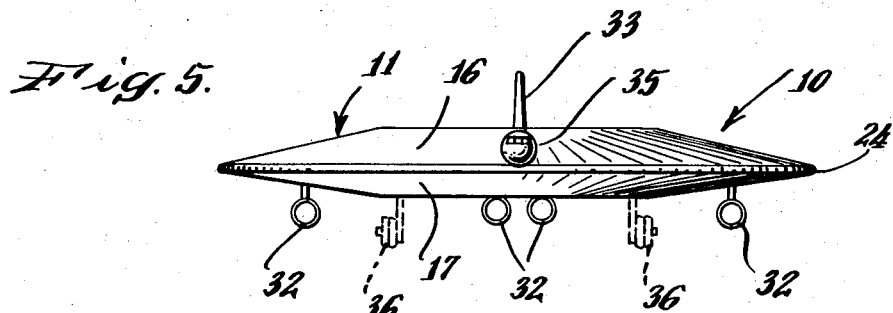
FIG. 5 is a front elevation.

Top 16 and bottom 17 wing surface members resting on the cantilever trusses 15 and intermediate trusses (not shown) are preferably light weight plate material such as aluminum alloys. As shown especially in FIGS. 5 and 6 the top 16 and bottom 17 members starting respectively from the top 40 and bottom 39 of hub wall 13 converge toward their peripheries and are joined there by a narrow wall 24.

The rotor 22 (FIGS. 2 and 6) comprises a vertical shaft 25 on which is mounted a rotor hub 26 from which the pitched blades 27 extend radially to a rim 29 to which the blades 27 are secured with the necessary pitch calculated for the particular aircraft in which the rotor is to be used.

The bearing plate 30 for mounting the rotor shaft 25 is supported by circumferentially spaced radial struts 31 connected between the bearing plate 30 and the wall 13 of the structural hub 12.

The radial struts 31 position the rotor shaft 25 concentrically with the vertical axis $AA^1$ of the aircraft 10.

A power source (not shown) is attached to the rotor shaft 25 and supported on bearing plate 30 and comprises the usual form of prime mover such as gas turbine or piston engine.

Power sources such as jet engines 32 are mounted on the rear portion of the wing 11 for propelling the aircraft 10 along its desired course. At least one propelling engine 32 must be mounted laterally remote of the longitudinal axis $BB^1$ to balance the rotative effect on the aircraft 10 induced by the rotor 22. Should a single driving engine 32 be used which would be mounted on the wing 11 in a reference vertical plane which would pass through the longitudinal axis $BB^1$, an additional engine $32^1$ would be required spaced laterally from the aforesaid vertical reference plane to balance the rotation induced in the aircraft by the rotor 22 during such time as the rotor 22 was operating. After the aircraft 10 has attained its desired elevation then the horizontal propelling engines are started and when the necessary forward speed is attained the rotor is shut down.

A tail member 33 is mounted on the rear portion of the wing 11 to assist in stabilizing the flight course and is provided with a rudder 34 for lateral steering of the aircraft 10. A fuselage 35 is incorporated in the forward portion of the wing 11 for housing the pilot crew and providing a central station for operating all of the controls.

Retractable landing gear of the usual form is denoted by numeral 36.

A rear portion of the bottom wing surface 17 (as will be noted in FIG. 4) by the area letters JMK has a lesser upward slope than the forward portion of the bottom wing surface 17 corresponding to PMK (FIG. 4). This lesser upward slope area JMK is most clearly shown in FIG. 6 by the angle Z (approximately 2-½°) between the rear portion JMK (FIG. 4) and an imaginary plane represented by the line $YY^1$ which passes through the bottom edge 39 of hub wall 13 and is parallel to longitudinal axis $BB^1$ and lateral axis $CC^1$. However it will also be noted, referring now to FIGS. 4, 2 and 6, that a sector portion denoted by letters DFGE included in the trailing half sector JMK has a steeper slope relative to the imaginary horizontal plane through YY' and at its radial edges blend into the bottom wing surface beginning at the hub wall 13 and extending rearward to the trailing edge as shown by the shading lines in FIG. 4 and (see FIG. 6) the vertical clear space above angle Z. The area thus defined, in addition to contributing to the dynamic properties of the airfoil, provides channel like clearance for engines.

Ailerons 38 provide means for rocking the aircraft about its longitudinal axis $BB^1$ and also for elevating the forward end of the aircraft about the lateral axis $CC^1$ of the aircraft.

In another embodiment 110 of my invention I provide a second rotor 122 arranged in tandem along the longitudinal axis $BB^1$ as shown in FIG. 8.

In this latter structure the hub 12 portion is elongated as 112 in FIG. 8 having the same preferred type of wall 113.

When two rotors are used they are rotated in opposite directions thus neutralizing any tendency of rotation of the aircraft about its vertical axis.

From the foregoing description it will be obvious that the aircraft 10 of my invention can be propelled vertically by rotor 22 and having reached its desired altitude the rotor 22 may be shut down and the flight of the aircraft on its course maintained by using its flight propelling engines 32. Since the rotor 22 is housed completely within the aircraft, it offers no wind resistance to flight of the aircraft along its desired course; hence a faster flight speed may be obtained with resulting economy.

With the aerodynamic properties of the wing contour gliding to a safe landing may be obtained in the event of power failure.

What is claimed is:

1. In an aircraft of the generally circular continuous single wing type defined by reference to vertical, longitudinal and lateral axes having a first means for producing vertical lift including a downwardly projected air stream, a second means for propelling the aircraft in a direction of its longitudinal axis, and adjustable guide members for controlling the desired flight direction, the structural improvement comprising:

a. a central hub portion having a continuous rigid vertical support wall parallel to the vertical axis of the aircraft forming an open end conduit means for directing the vertical air stream lift means, b. a plurality of radially extending wing support truss members mounted on said support wall, each said truss members disposed to engage both top and bottom wing surface members, respectively, to provide rigid unitary support means between said surface members and said support wall, c. a continuous top wing surface member mounted on the top of said support members extending radially from the top portion of said wall, d. a continuous bottom wing surface member mounted on the bottom of said support members and extending radially from the bottom portion of said wall, e. said wing surface members converging toward and subsequently substantially joining at the periphery of the wing; and f. a sector of the bottom portion of the rear wing surface extending from the adjacent rear portion of said support wall to the trailing edge of the wing and disposed at a steeper angle than the adjacent radial portions of bottom wing surface extending from said wall to the trailing edge of the wing, whereby to form a channel like sector.

* * * * *